United States Patent
Jarvius et al.

(10) Patent No.: US 11,455,719 B2
(45) Date of Patent: Sep. 27, 2022

(54) IMAGE BASED ANALYSIS OF SAMPLES

(71) Applicant: Q-linea AB, Uppsala (SE)

(72) Inventors: Jonas Jarvius, Uppsala (SE); Jan Grawe, Uppsala (SE)

(73) Assignee: Q-LINEA AB, Uppsala (SE)

( * ) Notice: Subject to any disclaimer, the term of this patent is extended or adjusted under 35 U.S.C. 154(b) by 735 days.

(21) Appl. No.: 16/310,125

(22) PCT Filed: Jun. 15, 2017

(86) PCT No.: PCT/EP2017/064711
§ 371 (c)(1),
(2) Date: Dec. 14, 2018

(87) PCT Pub. No.: WO2017/216310
PCT Pub. Date: Dec. 21, 2017

(65) Prior Publication Data
US 2021/0224978 A1  Jul. 22, 2021

(30) Foreign Application Priority Data

Jun. 15, 2016  (GB) .................................. 1610434

(51) Int. Cl.
*G06K 9/00* (2022.01)
*G06T 7/00* (2017.01)
(Continued)

(52) U.S. Cl.
CPC .......... *G06T 7/0012* (2013.01); *G02B 21/367* (2013.01); *G06T 5/50* (2013.01);
(Continued)

(58) Field of Classification Search
CPC .......... G06T 7/0012; G06T 7/70; G06T 5/50; G06T 2207/10056; G06T 2207/20221;
(Continued)

(56) References Cited

U.S. PATENT DOCUMENTS

| | | |
|---|---|---|
| 5,668,597 A | 9/1997 | Parulski |
| 7,769,219 B2 | 8/2010 | Zahniser |
| | (Continued) | |

FOREIGN PATENT DOCUMENTS

| | | |
|---|---|---|
| CN | 101558430 A | 10/2009 |
| CN | 102129115 A | 7/2011 |
| | (Continued) | |

OTHER PUBLICATIONS

International Search Report/Written Opinion of International Application No. PCT/EP2017/064711 dated Oct. 26, 2017, 21 pages.
(Continued)

*Primary Examiner* — Stephen P Coleman
(74) *Attorney, Agent, or Firm* — Fay Sharpe LLP (57) ABSTRACT

A method of image-based analysis of multiple samples includes using a sample holder having multiple locations of interest and multiple focal structures that are each associated, one or more, with the multiple locations of interest, wherein the multiple samples are dispersed across the multiple locations of interest and obtaining image areas of the multiple locations of interest. Multiple digital image areas are thus obtained for use in an analysis of the multiple samples with each of the image areas including at least one of the locations of interest and at least one of the focal structures. An image processing algorithm is used to analyse each of the digital image areas and check if the focal structure indicates that the image area is in clear focus. An indication is provided and/or remedial action is taken if the image processing algorithm indicates that any digital image areas are out of focus.

20 Claims, 4 Drawing Sheets

(51) Int. Cl.
*G06T 7/70* (2017.01)
*G02B 21/36* (2006.01)
*G06T 5/50* (2006.01)
*H04N 5/232* (2006.01)

(52) U.S. Cl.
CPC ............ *G06T 7/70* (2017.01); *H04N 5/23212* (2013.01); *G06T 2207/10056* (2013.01); *G06T 2207/20221* (2013.01); *G06T 2207/30024* (2013.01)

(58) Field of Classification Search
CPC ........ G06T 2207/30024; G02B 21/367; G02B 27/32; G02B 7/36; G02B 21/241; G02B 21/34; H04N 5/23212
USPC ......................................................... 382/133
See application file for complete search history.

(56) References Cited

U.S. PATENT DOCUMENTS

| | | | |
|---|---|---|---|
| 8,133,741 | B2 | 3/2012 | Potyrailo |
| 8,442,396 | B2 | 5/2013 | Shu |
| 2006/0045505 | A1 | 3/2006 | Zeineh |
| 2012/0244519 | A1* | 9/2012 | Olesen ............... G02B 21/0004 435/2 |
| 2013/0027518 | A1 | 1/2013 | MacKay et al. |
| 2013/0266204 | A1* | 10/2013 | Quan .................... B01L 3/5025 382/141 |
| 2013/0342750 | A1* | 12/2013 | Foote ................... H04N 5/3532 348/349 |
| 2014/0160267 | A1 | 6/2014 | Kawakami |
| 2015/0219979 | A1 | 8/2015 | Zhou et al. |
| 2015/0293270 | A1* | 10/2015 | Jarvius ................... G02B 27/40 348/79 |

FOREIGN PATENT DOCUMENTS

| | | |
|---|---|---|
| CN | 103688205 A | 3/2014 |
| CN | 103592754 A | 3/2016 |
| GB | 2 395 267 A | 5/2004 |
| JP | H0917720 | 1/1997 |
| JP | 2006258444 | 9/2006 |
| KR | 2008-0069209 | 7/2008 |
| WO | WO 2004/103563 A2 | 12/2004 |
| WO | WO 2007/049843 A1 | 5/2007 |

OTHER PUBLICATIONS

United Kingdom Search Report of GB 1610434.1 dated Nov. 17, 2016, 4 pages.

* cited by examiner

IMAGE BASED ANALYSIS OF SAMPLES

The present invention relates to methods and devices for image based analysis of multiple samples, and to sample holders for use in such image based analysis of samples. In some examples the image based analysis of samples involves the detection of the presence, amount, and/or absence of microscopic objects in the sample, such as microscopic biological objects.

It is important in various fields to be able to analyse samples quickly and efficiently and in particular to be able to detect and/or count small objects such as bioparticles, molecules, cells and so on. In biotechnology, for example in relation to DNA replication/amplification, it can be important to be able to detect molecular elements such as rolling circle products (RCPs). In medicine, medical conditions caused by microbiological agents are generally diagnosed through the testing of a sample taken from a patient. A key objective (particularly with life-threatening conditions with a rapid progression rate, such as sepsis) is to have the sample analysed as quickly as possible, so that the microbe can be identified and an appropriate and targeted treatment administered. There is hence a clear need for a quick and reliable way to analyse samples that may contain microscopic objects.

One known system for detecting microscopic objects is flow cytometry. This is a laser-based, biophysical technology employed in cell counting, cell sorting, biomarker detection and protein engineering. Cells are suspended in a stream of fluid and passed by an electronic detection apparatus. Flow cytometry allows simultaneous multiparametric analysis of the physical and chemical characteristics of up to thousands of particles per second. However, flow cytometry is a complex analysis method.

In US 2015/293270 Q-Linea AB proposed an apparatus for detection of microscopic objects that uses a detection disc with channels for a fluid sample and focus structures adjacent to the channel. The focus structure is advantageously a groove formed during moulding of an optically flat sample holder, with the groove being formed of precise dimensions by taking advantage of the crystal structure of a silicon template. The silicon template has an optically flat surface and it is etched to form the groove, which is aligned with the silicon's crystal planes. The template is then used in creating a master, for example via electroplating of nickel, and the master acts as a mould for the sample holder so that the sample holder has an optically flat surface as well as a precisely shaped focus structure. The imaging method proposed in the preferred embodiment of US 2015/293270 involves the use of a dedicated focussing camera that establishes a focal plane based on the accurate depth of the groove, and a second camera that takes an image of the channel with the same focal plane so that microscopic objects in the channel have the correct focus. This apparatus and sample holder provide significant advantages compared to prior art systems, and in particular give the ability to reliably focus on and hence detect individual microscopic objects in the channels. However, there remains a need to further improve on the capabilities of methods, devices and sample holders in this field.

Viewed from a first aspect, the invention provides a method of image-based analysis of multiple samples, the method comprising: using a sample holder having multiple locations of interest and multiple focal structures that are each associated one or more with the multiple locations of interest, wherein the multiple samples are dispersed across the multiple locations of interest; obtaining image areas of the multiple locations of interest, thereby obtaining multiple digital image areas for use in analysis of the multiple samples with each of the image areas including at least one of the locations of interest and at least one of the focal structures; using an image processing algorithm to analyse each of the image areas and check if the focal structure indicates that the image area is in clear focus; and providing an indication and/or taking remedial action if the image processing algorithm indicates that any digital image areas are out of focus.

An image area may be a composite of a plurality of frames. For example, a line camera may be used, each frame of which is a single line of pixels, and which scans along and outputs a composite composed from the plurality of frames. Where the line camera scans along a plurality of locations of interest and corresponding focal structure(s), the image area may be the composite which includes all of the scanned plurality of locations of interest and corresponding focal structure(s). Alternatively, the composite may be segmented to divide it into a plurality of image areas, each image area including a subset of the locations of interest and corresponding focal structure(s) (for example, just one location of interest and corresponding focal structure(s)).

An image area may be a single frame. For example, an area camera may be used which separately images each location of interest with corresponding focal structure(s), such that each frame shows a single location of interest and corresponding focal structure(s). Each separate frame then corresponds to an image area. Alternatively, a plurality of locations of interest with corresponding focal structure(s) may be captured in single frame, and this single frame may constitute a single image area.

An image area may be a subset of a single frame. An area camera may be used which images in a single frame a plurality of locations of interest and corresponding focal structure(s), and the single frame may then be segmented to divide the frame into a plurality of image areas, each image area including a subset of the locations of interest and corresponding focal structure(s) (for example, just one location of interest and corresponding focal structure(s)).

An image area may also be a composite of a plurality of frames captured by an area camera.

As should be clear from the foregoing discussion, an image area is a frame, subset of a frame or a composite of a plurality of frames which includes at least one of the locations of interest and at least one of the focal structures. Subsequently, "image areas" are referred to as "digital images" or simply "images".

With this method it becomes possible to gather images over a large number of locations of interest as quickly as possible, whilst also ensuring that the accuracy of the images can be checked automatically by checking the image of the focal structures, which could also be described as focussing reference structures. In contrast to the method of US 2015/293270 there is no separate focussing step for each image, which can lead to a longer time being required for the imaging process. The added time can be considerable when large numbers of samples and locations on the sample holder are involved. The focus for each image can be checked via the image processing algorithm after the digital images have been gathered (although optionally in parallel with taking subsequent digital images of the same sample holder) since each image includes one or more focal structures associated with the location of interest and not only the location of the sample. This can be done by checking that the focal structures are imaged clearly, where the focal structures lie in the focal plane for clear imaging of the samples. Alternatively in some cases the focal structures may be outside of the focal plane, in which case the focus for each image may involve checking that the focal structures are imaged in a manner that is consistent with the required focal plane. The proposed method can greatly reduce the time taken to obtain and check the focus of multiple images for multiple samples and time savings can be made even where one or more images are out of focus and remedial action may be needed.

The method may include the use of an imaging device having a pre-set focal plane in order to obtain the multiple images. This can allow for the images to be obtained as quickly as possible, relying on an assumption that the sample holder and the apparatus are well aligned and present a flat focal plane to the imaging device. All the required images can be gathered based on the pre-set focus of the pre-set focal plane with the speed of this process being limited only by the speed of the imaging device itself. Alternatively, the imaging device may obtain the images with continuous focussing, preferably independent of any focussing structures. Rapid continuous focussing devices are available and although there may be an effect from this on the speed of obtaining the images, the method of the first aspect still provides a quicker process than the prior art method involving checking the focus via the focal structure for each imaging step. In the case of continuous focussing during obtaining the images then the focus is still checked afterwards to ensure that the focussing process has been completed correctly.

The proposed method provides significant advantages in situations where the analysis of the sample involves confirming if a feature is present or absent, especially in the case of imaging of microscopic objects where the correct focus is very important in obtaining a clear and reliable image. The samples may be samples where it is required to determine the presence, amount, and/or absence of microscopic objects in the samples. The imaging may hence be imaging with magnification and/or a high resolution suitable for imaging of microscopic objects. The method may include determining if a microscopic object is present in the image, for example using the image processing algorithm or a further image processing algorithm. An absent feature can be difficult or impossible to differentiate from an out of focus image, especially where microscopic objects are involved. Through the use of at least one focal structure associated with each location of interest it is possible to confirm, via the image analysis algorithm, that the images are in focus and thus that an absence of a feature in the image is a reliable indication that this feature is not present in the sample. In this way the risk of a false negative can be minimised and there is a high degree of confidence in a negative result from the analysis of the sample(s). The same focus checking process means that there is a similarly high degree of confidence when determining if microscopic objects are present and/or when determining an amount of microscopic objects.

The microscopic objects may be objects contained in a sample fluid, and the locations of interest on the sample holder may hence be volumes for containing the sample fluids of the multiple samples. The sample fluid will typically be a liquid with objects suspended in the liquid. Alternatively, the objects may be predominantly located on a surface, for example a bottom surface, of the volumes containing the sample fluid. The volumes may hence have a depth in the direction of the focal depth, and a cross-section in a two dimensional plane corresponding to a plane of the digital images. The locations of interest may include wells and/or channels in or on the sample holder that provide the volumes for containing the sample fluids. As explained above, each digital image includes the location of interest as well as one or more associated focal structure(s).

Preferably the associated focal structure(s) are in close proximity to the respective location(s) of interest. The focal structures may be placed within the volumes of the location of interest, such as at the base of the volume. Alternatively, the focal structures may be adjacent to the volume and sufficiently close to an edge of the volume that it can be included in the same image. Thus, the imaging device and the sample holder as a combination are arranged such that the imaging device is capable of imaging the volume of the location of interest and the focal structure in the same image area.

The image area may be a frame captured by an imaging device, or may be a subset of a frame or may be a composite of a plurality of frames.

The imaging device may be a line camera which captures a plurality of frames by scanning along a location of interest and corresponding focal structure(s) and outputs a composite composed from the plurality of frames. In that case, information that a given focal structure is in or out of focus may only be applicable to the other parts of the same line. Lines imaged before or after the focal structure will not contain focus information.

If the image area is a single frame captured by an area camera, then if an imaging device of larger field of view is selected then the focal structure need not be so close to the location(s) of interest, whereas if the sample holder can be manufactured with the focal structure in very close proximity to the location(s) of interest then there are fewer constraints on the performance of the imaging device. As explained in more detail below, one example sample holder has multiple wells spaced apart along a channel that provides for fluid communication between the wells. The width of the wells may for example be 1-5 mm, preferably 1 to 3.5 mm and preferably 1.5-3 mm, with a depth of up to 5 mm. The focal structure(s) may be adjacent the end of the channel, within sufficient distance that the imaging device can take an image including the channel and the associated focal structure. The focal structure might be within three or four times the width of the well from the end of the channel.

Instead of providing focal structure(s) adjacent to the end of each channel, the focal structure(s) may be provided between adjacent wells. The focal structure(s) may be spaced inwardly of the outer width of the wells, where the width is the extent of the well in the direction perpendicular to the line along which the multiple wells lie. Such an arrangement is particularly advantageous in the case that a line camera is used.

Where a line camera is used for imaging, a plurality of focal structures may be placed so they are visible in, for example, every 10th line, every 50th line, or every 100th line imaged by the line camera. Alternatively, each channel may be associated with a single focal structure comprising a groove or line which runs alongside the length of the channel, within the field of view and parallel to the direction of motion of the line camera. In that case, part of the focal structure may be present in each line imaged by the line camera.

The method may be used with samples that may contain microscopic objects including particles (particularly bio-particles), cells, micro-organisms such as bacteria, other pathogens such as viruses and fungal pathogens and/or molecules including macromolecules. The microscopic objects can include any object that is suitable small in size and can be detected based on imaging methods, including potentially the use of fluorescence of the object or of a fluorescent composition applied to the object. In some examples, if the objects are translucent objects without scattering properties, such as RCPs, the objects may be 10 µm or less in size, perhaps 5 µm in size or smaller. The objects may have a largest dimension of 2 µm or less, perhaps 1.5 µm or less, 1 µm or less and in some cases 0.5 µm or less.

In some example embodiments the sample holder is a consumable single-use product that can be disposed of after use. This allows for repeated use of the same imaging device with the method without the need for cleaning of the sample holder and minimise the risk of contamination of samples. The method may include image based analysis of a first set of samples using a first sample holder, and subsequent image based analysis of a second set of samples and optionally further sets of samples using further sample holders.

The sample holder may have an optically flat surface, and may comprise a transparent material. The sample holder may comprise a single part for holding all of the samples and all of the locations of interest, in which case the form and manufacture of the sample holder can be similar to that of US 2015/293270. Alternatively, the sample holder may be layered with a first layer having an optically flat surface including the focal structures and providing the base for volumes containing the samples, with the volumes being enclosed within a second layer on top of the flat layer. The optically flat layer may be manufactured using a master that itself is derived from a template with similar shape to the optically flat layer. Thus, the optically flat layer may be manufactured in a similar fashion to a CD. This allows for an optically flat surface and accurate moulding of focal structures as well as optionally other surface features of the optically flat layer. A CD-type manufacturing process is particularly useful in the case of a consumable single-use product since it can be used for cost effective mass production of the sample holder, or a layer for the sample holder, with an optically flat surface and accurately shaped and positioned focus structures.

Where a layered structure is used then there may be a third layer that encloses the tops of the volumes, preferably a layer that is compatible with the imaging system, for example a layer that is transparent to visible light. The third layer may comprise a gas permeable material and/or may include openings for release of gases from the samples. The third layer could have vents or holes, optionally covered with gas permeable membranes. This can allow gases to escape whilst the sample holder is filled with samples.

The focal structures may be shapes with a least one sharp edge or vertex at the required depth for the correct focal plane. This generates a feature with a sharp contrast in the digital image and hence provides an image feature than can be easily and reliably identified by the image processing algorithm when the image is in correct focus. Preferably the focal structures include three dimensional shapes, which may be formed as pits or protrusions in the sample holder. The focus structures can be shaped to provide sufficient contrast resolution for both transmitted and reflected light imaging. In an advantageous example, the three dimensional shapes are configured such that light passing through material beneath the optically flat layer is refracted and/or reflected so as to transmit a pattern of light with sharp contrast to the imaging device. For example, the focal structures may include angled sides with the angle set based on the refractive index of the material that surrounds the focal structures such that all of or the majority of incident light from beneath the focal structure is reflected internally, to greatly reduce the amount of light from the focal structure entering the optical detection system.

In some example embodiments the focal structures include grooves or pyramid shaped cavities in the sample holder. The vertex of a pyramid shaped cavity or the base of a groove can provide the required sharp contrast in the digital image. The method of the first aspect can provide the advantages as discussed above when used with a groove as in US 2015/293270, and thus the method may include using a sample holder with a channel and groove arrangement as in US 2015/293270.

The method may include the use of a sample holder with focal structures moulded based on the features formed using the crystal planes of a template or a master, for example by etching of a silicon template that is used to form a master with the reverse geometry, where the sample holder or a layer thereof (such as the optically flat layer discussed above) is formed by moulding based on the master. The silicon crystal planes can provide an angle of 54.7° between the side walls of the focal structure and the optically flat surface, and with a transparent material around the focal structure there are various materials available that are capable of generating total internal reflection of light shining from beneath the focal structure, for example materials such as Zeonor® polymers as discussed below. A CD type manufacturing process similar to that proposed in US 2015/293270 may be used to produce this layer. It should be noted that although a preferred embodiment uses a circular geometry similar to a CD this is not an essential feature and alternative geometries could be used, whilst still making use of the CD type moulding process to ensure an optically flat surface and accurately formed focus structures.

There may be multiple grooves and/or pyramids in each focal structure associated with each location of interest, with each of the multiple grooves and/or pyramids being the same depth and hence providing a feature with a sharp contrast at the same focal depth. An example sample holder using one or more pyramid focal structure(s) is described in more detail below, along with a method for manufacture of such a sample holder. As discussed below, the focal structures may each include multiple pyramids, which results in advantages since there are multiple vertices as focussing reference points that are spaced apart on the required focal plane.

The focal structures may also be used as fiducial marks for local x-y reference.

The samples may be test samples where the presence, amount, and/or absence of microscopic objects depends on the results of a test. One use for the method is drug susceptibility testing such as antibiotic susceptibility testing (AST), where the ability to quickly obtain multiple images for analysis of multiple samples can be highly important. The method of preferred embodiments may hence be a method of image based analysis of multiple samples for microscopy based AST. In the case of AST the sample holder may be used with multiple samples of interest relating to multiple different antibiotics and/or different concentrations of antibiotics, wherein the digital images are for determining presence or absence of micro-organisms such as bacteria and/or the amount of micro-organisms, thereby identifying which antibiotics and/or which concentrations are effective at inhibiting microbial growth. The analysis of the samples may include using the image processing algorithm or a further image processing algorithm to identify which samples include microbes and preferably the amount of microbes in the samples. The method can include taking multiple sets of images at different times in order to establish the growth rate of the microbes, and hence enable parameters such as the minimum inhibitory concentration (MIC) for an antibiotic to be established. The method may include using a sample holder with features for drug testing such as microscopy AST as explained in more detail below.

Where a pre-set focal plane is used, then the pre-set focal plane may be a parameter of the imaging device that is set based on a standardised format and location for the sample holder. Alternatively, the pre-set focal plane may be set prior to obtaining the images, for example by taking one or more reference image(s) using one or more of the focal structures and by determining the best focus for the imaging device based on the reference image(s).

Where the method includes providing an indication of out of focus images then the indication may include identifying the image as an image needing further analysis and/or checking (i.e. verification). Alternatively or additionally the indication may include identifying the image as potentially untrustworthy. In some cases there may be sufficient information from the remaining, in focus, images to allow any out of focus images to be disregarded. In that case no further remedial action would be necessary. For example, if the image based analysis of samples is being used for AST and the out of focus image concerns a lower concentration of antibiotic when there is a clear image showing that a higher concentration of the same antibiotic has not been effective, then there may be no need to address the out of focus image, since it may be irrelevant to determining the required concentration of antibiotic to use.

Where the method includes taking remedial action then the remedial action may be re-imaging the location of interest where the original image was out of focus, using image processing to remove out of focus areas, or adjusting the original digital image data to improve the digital image.

The imaging device can include optical and electronic elements as required to capture a digital image at the required magnification. The imaging device may be a conventional digital camera using a two dimensional digital image sensor, such as a CCD or CMOS sensor. The sample holder and digital image sensor may be moved relative to one another so that the sensor can capture digital images at all of the locations of interest on the sample holder. For example the sample holder may be rotated and the imaging device may be translated in order that images can be obtained any point on a circular area of the sample holder. Alternatively, the imaging device may be a line camera with a linear digital image sensor, such as a linear CCD sensor. In this case the sample holder and digital image sensor may be moved relative to one another during capturing of each image as well as moving between the different locations of interest. The method could include the use of multiple imaging devices in order to further speed up the process of imaging the samples.

When using an area camera, where the image area is a single frame which shows a single location of interest and corresponding focal structure(s), the process of imaging may be as follows:
1. Move to the location of interest;
2. Pause to allow the system to settle, so that neither the image sensor nor sample holder are in motion;
3. Autofocus the image sensor;
4. Image the area of interest; and
5. Repeat steps 1 to 4 for each location of interest.

When imaging multiple locations of interest, it is advantageous (simpler and faster) to instead use a line-scan imaging approach, together with a tracking autofocus. The process may be as follows:

1. Move to the first line of locations of interest; and
2. Image the entire line of locations of interest in one go, moving the line of locations of interest across the camera line while continuously adjusting the focus.

The camera may output a series of frames (i.e. single lines of pixels) to a frame grabber card which creates a composite image from the plurality of frames. This composite image can contain parts that are in focus and parts that are out of focus. The composite image may be passed to image analysis software which cuts and truncates the composite image into relevant parts, i.e. into a plurality of image areas each comprising a location of interest with corresponding focal structure(s). The image areas may then be analysed by the software.

In both of the methods above, the focus may be extrapolated between two points. For a line camera this only requires extrapolation along the line of the line camera, whereas for an area camera this requires that the extrapolation is relevant for an area between a number of points measured. The latter sets higher requirements on the flatness and quality of the consumable. Therefore the line camera extrapolation is beneficial from a consumable perspective.

An further alternative method is on-the-fly area imaging. Here, the locations of interest can be moved continuously along a line of imaging as for line imaging. However, an area scan camera is used, which is exposed at relevant times during the traverse. The exposure time is short enough to maintain image quality, and the frequency of imaging is compatible with the frame rate of the area scan camera. The exposure time may be set by the camera itself, or by strobing the illumination in sync with the locations of interest being in the field of view.

Viewed from a second aspect, the invention provides a computer programme product containing instructions for execution on a device for image-based analysis of multiple samples, the device comprising a sample holder having multiple locations of interest and multiple focal structures each associated with one or more of the multiple locations of interest, wherein the multiple samples are, in use, dispersed across the multiple locations of interest; an imaging device; and an image processing system; wherein the instructions when executed will configure the device to: obtain digital image areas of the multiple locations of interest using the imaging device with each of the image areas including at least one of the locations of interest and at least one of the focal structures; analyse each of the digital image areas and check if the at least one focal structure indicates that the image area is in clear focus; and provide an indication and/or take remedial action if the image processing algorithm indicates that any digital image areas are out of focus.

As explained in detail in reference to the first aspect, an image area may be a frame, subset of a frame or a composite of a plurality of frames which includes at least one of the locations of interest and at least one of the focal structures. Subsequently, "image areas" are referred to as "digital images" or simply "images".

The instructions may also be arranged to configure the device to carry out any of the method steps set forth above, for example by controlling the imaging device to take remedial action by taking additional images. The device for image-based analysis of multiple samples may have features as described below, and it should also be noted that as mentioned below the device for image-based analysis of multiple samples may be made up of multiple separate elements that may be separated or remote from one another. For example, the image processing system might be a part of a different physical system than the imaging device, such as a separate computer system in communication with the imaging device from a remote location.

Viewed from a third aspect, the invention provides a device for image-based analysis of multiple samples, the device comprising: a sample holder having multiple locations of interest and multiple focal structures each associated with one or more of the multiple locations of interest, wherein the multiple samples are, in use, dispersed across the multiple locations of interest; an imaging device being arranged to obtain image areas of the multiple locations of interest with each of the image areas including at least one of the locations of interest and at least one of the focal structures; and an image processing system arranged to analyse each of the digital image areas and check if the focal structure indicates that the image area is in clear focus; and provide an indication and/or take remedial action if the image processing algorithm indicates that any digital image areas are out of focus.

As explained in detail in reference to the first aspect, an image area may be a frame, subset of a frame or a composite of a plurality of frames which includes at least one of the locations of interest and at least one of the focal structures. Subsequently, "image areas" are referred to as "digital images" or simply "images".

The imaging device may be a line camera configured to capture a plurality of frames by scanning along a location of interest and corresponding focal structure(s) and output a composite composed from the plurality of frames.

This device can be operated in accordance with the method of the first aspect and provides similar advantages. The device may hence be without a separate focussing camera used in parallel with the imaging device. The device may be for use with samples where it is required to determine the presence, amount, and/or absence of microscopic objects in the samples. The imaging device may hence be arranged for imaging with magnification and/or a high resolution suitable for imaging of microscopic objects. The imaging processing system may be arranged to determine if a microscopic object is present in the image.

The device for image-based analysis of multiple samples may include the samples and the samples may include microscopic objects contained in a sample fluid, such as the microscopic objects discussed above. The fluid may be a liquid with the microscopic objects held in suspension. Alternatively, the microscopic objects may be located on a surface, for example a bottom surface, of a sample holder or slide holding the sample fluid. The sample fluid may include clinical samples or material derived from clinical samples, wherein the clinical samples include, but are not limited to, blood, serum, plasma, blood fractions, joint fluid, urine, semen, saliva, faeces, cerebrospinal fluid, gastric contents, vaginal secretions, mucus, a tissue biopsy sample, tissue homogenates, bone marrow aspirates, bone homogenates, sputum, aspirates, wound exudate, swabs and swab rinsates e.g. a nasopharyngeal swab, other bodily fluids and the like. The sample fluid may include a culture medium and could be a mixture of clinical samples or material derived from clinical samples with culture medium. The samples may be test samples as discussed above. The samples may be divided into fractions/aliquots/portions, each exposed to a different culture medium.

The locations of interest on the sample holder may be volumes for containing sample fluids of the multiple samples. The volumes may be as discussed above, and thus could include wells and/or channels. The sample holder may have focal structures in proximity to the locations of interest as set out above.

In some example embodiments the sample holder is a consumable single-use product that can be disposed of after use. The device for image-based analysis of multiple samples may be arranged to support the sample holder relative to the imaging device, for example in a cassette system and/or on a turntable. There may be a releasable connection between the sample holder and the imaging device, for example a connection allowing for the sample holder to be disengaged from the imaging device by hand. Couplings similar to those used to hold compact discs in compact disc readers might be used.

The sample holder may be as discussed above, and also could have features as discussed below in relation to the fourth aspect.

The device for image-based analysis of multiple samples may be arranged to determine the pre-set focal plane prior to obtaining the images. For example the imaging device may be configured to capture one or more reference image(s) of one or more of the focal structures and the image processing system may be arranged to determine the best focus for the imaging device based on the reference image(s).

The image processing system may be arranged to prompt the imaging device to take remedial action by taking additional images of locations of interest that were out of focus in the original images. The device for image-based analysis of multiple samples may be made up of multiple separate elements that may be separated or remote from one another. For example, the image processing system might be a part of a different physical system to the imaging device, such as a separate computer system in communication with the imaging device from a remote location. The image processing system may itself be distributed across different hardware elements, for example with one sub-system carrying out the focus checking steps and one sub-system determining if a microscopic object is present in the image after the focus has been verified.

The imaging device may include optical and electronic elements as required to capture a digital image at the required magnification. The imaging device may be a conventional digital camera using a two dimensional digital image sensor, such as a CCD or CMOS sensor. The sample holder and digital image sensor may be moved relative to one another so that the sensor can capture digital images at all of the locations of interest on the sample holder. Alternatively, the imaging device may be a line camera with a linear digital image sensor, such as a linear CCD sensor. In this case the sample holder and the image sensor may be moved relative to one another during capturing of each image as well as moving between the different locations of interest. The method could include the use of multiple imaging devices in order to further speed up the process of imaging the samples.

Viewed from a fourth aspect the invention provides a sample holder for use in a device for image-based analysis of multiple samples, which may be a device as discussed above, the sample holder comprising: an optically flat surface; multiple locations of interest dispersed across the optically flat surface that each, in use, correspond to locations of a sample of the multiple samples; and multiple focal structures associated with the multiple locations of interest; wherein the focal structures each comprise at least one pyramid shaped indentation in the optically flat surface.

The use of a pyramid is not disclosed in US 2015/293270, although it may fall within the scope of the claims thereof. The inventors have realised that a pyramid provides advantages in terms of ease of manufacture without negative impact on the ability to check the focus as required in connection with the first to third aspects discussed above. A pyramid can be a less complicated shape than a groove to manufacture with the required accuracy to act as a focal structure. For example, a pyramid can be more easily etched into a crystalline material such as silicon, which can then be used in the manufacture of a master for moulding of the optically flat surface of the sample holder. A pyramid can be etched via a circular hole formed in a mask, whereas a groove needs an elongate hole in the mask, which can be more difficult to form accurately. Thus, the optically flat surface and the focal structures may be produced based on an etched template, with the surface and the planes of the focal structures being aligned with crystal planes of the template material, such as crystal planes of silicon. The use of a pyramid structure is also beneficial if a high number or high density of focus structures is needed. It is required that at least one of the focus structures is visible within each image field, and that could require many focus structures if high magnification is needed to analyse biological structures in many different locations of interest on the sample holder. As the pyramid focal structure is easier to manufacture then the advantages of using this shape of focal structure increase for the greater number of focal structures.

The sample holder is preferably a consumable single-use product, and may be for use with the method and/or device described above. The sample holder may be arranged for stacking with multiple other similar sample holders.

In some example embodiments each of the focal structures includes multiple pyramid shaped cavities in the optically flat surface, with each of the pyramids having the same depth such that the focal structure has multiple focal reference points via the vertices of the multiple pyramids. There may be additional features of the focal structures as well, such as grooves or the like, although in one example the focal structures include only pyramids and no grooves. The depth of each of the pyramids may be the same and this depth may have a fixed (that is, predetermined, known in advance, or non-arbitrary) value. When the pyramids are formed based on a template with pyramids etched aligned with crystal planes then the depth of the pyramid is directly linked to the size of the base of the pyramid and the pyramids may all be identical in size and shape, within the tolerance of the manufacturing process. The pyramids may for example be 5-100 μm deep, such as 5, 10, 20, 30, 40, 60, 80 or 100 μm deep with a square base of side length in a similar range of sizes. When the crystal planes of silicon are used then the base length will be equivalent to twice the depth divided by $\tan(54.7°)$.

It will be appreciated that a CD type manufacturing process as discussed above can be used, and a preferred embodiment of the sample holder is a disc shape with a circular geometry similar to a CD. This is an advantageous feature but not an essential feature and alternative geometries could be used, whilst still making use of a similar template and master moulding process to ensure an optically flat surface and accurately formed focus structures.

The locations of interest on the sample holder may be volumes for containing sample fluids of the multiple samples. The volumes may be as discussed above, and thus could include wells and/or channels. The sample holder may have focal structures in proximity to the locations of interest as set out above, and where there are multiple pyramids in each focal structure then the spacing between each pyramid is no more than the spacing of the focal structure from the location of interest.

In one example embodiment, each focal structure includes multiple pyramid indentations, preferably at least four symmetrically spaced pyramid indentations, with the indentations spaced apart from each other by a distance that is no more than three times the width of the volume at the location of interest associated with the focal structure, optionally no more than twice or one times the width. When the focal structure is smaller than the width of the volume then it may be placed within the volume, for example at the base (i.e. the bottom surface) of the volume. Alternatively the focal structure may be adjacent to the volume, for example it may be sufficiently close to an edge of the volume that it can be included in the same image. The spacing of the focal structure from the volume may be no more than four times the width of the volume, optionally by no more than three times the width of the volume. That is, if the volume has width W, then the distance between the edge of the volume and the focal structure is no more than 4 W, optionally no more than 3 W. There may be four pyramid indentations spaced apart at four corners of a square, or a rectangle, for example. There may be two pyramid indentations at each end of each volume, and the focal structure for that volume may comprise those four indentations. Using at least four pyramid indentations in this way gives focussing reference features that are spaced apart in two dimensions on the optically flat surface, which means that the focus of an image can be checked with reference to both of the axes of the plane of the optically flat surface. Any undesired tilt in the focal plane of an imaging device relative to the optically flat surface can hence be detected. This might be during a method of image based analysis of samples as discussed above, and/or whilst the required focal plane is being pre-set for the imaging device. The focal structure may further include a circular feature around the pyramid indentations. This can make the location of the indentations easier to find by the naked eye or in images with lesser magnification.

As noted above, one example sample holder has multiple wells spaced apart along a channel that provides for fluid communication between the wells, with the focal structure(s) sufficiently close to the edge of the channel that it can be included in the same image. The wells along the channel are locations of interest and multiple samples may be placed in the wells. It is an advantage to have multiple wells connected by a channel since then it is only necessary to dispense the sample fluid in into one position in order to fill multiple wells, and also because such a structure has fewer orifices which may need to be closed. It is preferred for the ratio of dispensing locations to the number of wells to be considerably less than 1:1, for example 5 or more wells for each dispensing location. The dispensing locations may be openings in a covering layer that encloses the tops of the wells and the channels, for example openings in a third layer of a layered sample holder as described below.

A geometry of this type could be used for sample testing methods including drug susceptibility testing such as AST, where a single type of sample fluid needs to be tested in combination with multiple different compositions of a chemical or biological agent. For example, with AST then the wells along a channel could be provided with multiple differing types of antibiotics or multiple differing concentrations of an antibiotic, the wells can be filled with a sample fluid, for example a sample fluid comprising a clinical sample or material from a clinical sample (such as clinical samples as set out above). The clinical sample could be from a patient suffering from an infection. The channel is used to distribute the sample between the wells. Then, after a period of time, optionally including exposing the sample holder to required incubation conditions, such as a required temperature and/or agitation, the samples in the sample holder may be imaged and analysed as described above. These steps can be combined with the method described above, using a sample holder with multiple wells, to provide a method for image based analysis of multiple samples for AST.

One particularly preferred sample holder, which may be for drug susceptibility testing such as AST, has multiple channels, each channel with multiple wells spaced apart along the channel and connected by the channel, and each channel having an associated focal structure. The channels may be arranged in a circular array extending along radii of a circular sample holder, with the focal structures at the outer ends of the channels and hence being about a circumference of the sample holder (or around a circle concentric with the centre of the sample holder).

In a similar sample holder, rather than having just one associated focal structure, each channel may have a plurality of associated focal structures spaced at set distances from the centre of the sample holder, such that the focal structures lie along concentric circles centred on the centre of the sample holder. Where a line camera is used, the plurality of focal structures may be placed so they are visible in, for example, every 10th line, every 50th line, or every 100th line imaged by the line camera.

Alternatively, each channel may be associated with a focal structure comprising a groove or line which runs alongside the length of the channel, within the field of view and parallel to the direction of motion of the line camera. In that case, part of the focal structure may be present in each line imaged by the line camera.

A sample holder for drug susceptibility testing such as AST may include multiple wells with antibiotics in the wells ready for use with a sample fluid. For example, the wells may include the antibiotics in powder form, with different wells including different antibiotics and/or antibiotics in different concentrations.

The sample holder may comprise a transparent material, which can be the material of the optically flat surface and the focal structures. This may be a transparent injection moulded polymer, for example UV-grade-PMMA, PMMA, PC or other COC polymer based materials. The refractive index of the material should preferably be greater than about 1.22 (i.e. 1/sin(54.7°)) when the crystal planes of silicon or a similar material is used to form the focal structures, since in this case the angle between the optically flat surface and the side wall of the focal structure will be 54.7°, and when the light is incident on the sample holder from air. Possible materials include Zeonor® 1060R with a refractive index of 1.5, or hardened PDMS (refractive index 1.4). If the light is incident through water, for example, the refractive index will need to be higher (greater than approximately 1.63).

The sample holder may comprise a single part for holding all of the samples and all of the locations of interest, in which case the form and manufacture of the sample holder can be similar to that of US 2015/293270. Alternatively the sample holder may be layered with a first layer having the optically flat surface including the focal structures and providing a base for the volumes containing the samples, with the volumes being enclosed within a second layer on top of the first, optically flat, layer. The optically flat layer may be manufactured using a master that itself is derived from a template with similar shape to the optically flat layer. Thus, the optically flat layer may be manufactured in a similar fashion to a CD. This allows for an optically flat surface and accurate moulding of focal structures as well as optionally other surface features of the optically flat layer. A CD-type manufacturing process is particularly useful in the case of a consumable single-use product since it can be used for cost effective mass production of the sample holder, or a layer for the sample holder, with an optically flat surface and accurately shaped and positioned focus structures.

Where a layered structure is used then there may be a third layer that encloses the tops of the volumes, preferably a layer that is transparent to the imaging system, for example a layer that is transparent to visible light. The third layer may comprise a gas permeable material and/or may include openings for release of gases from the samples. The third layer could have vents or holes, optionally covered with gas permeable membranes. This can allow gases to escape whilst the sample holder is filled with samples. The third layer may have openings for dispensing sample fluid into the volumes of the locations of interest. Preferably, as noted above, there are considerably fewer openings than there are locations of interest with fluid pathways joining each opening to multiple locations of interest, such as the channel and well arrangement set out above.

The invention further extends to a template used either to produce the optically flat surface and focal structures for a sample holder or to produce a master that is used to produce the optically flat surface and focal structures for a sample holder, this template comprising an optically flat surface and multiple focal structures, or mirror images of focal structures, with the focal structures dispersed on the optically flat surface and located so as to be associated with multiple locations of interest, and the focal structures comprising multiple pyramid indentations in the surface of the sample holder.

This template may be for producing the optically flat surface and focal structures of the sample holder of the fourth aspect. Preferably it is a template for forming a master that is used to mould the sample holder, for example using injection moulding, and in this case the template may advantageously be formed of a crystalline material with the crystal planes of the crystalline material being used to set the geometry of the pyramid focal structures. It will be appreciated that one particular example is the use of silicon with the crystal planes of the silicon aligned to provide with the optically flat surface and the sloping sidewalls of the pyramids. The (100) surface of the silicon may be the optically flat surface with the four pyramid side walls being aligned with the {111} planes of the silicon. The size and layout of the pyramids can be as discussed above.

Another aspect of the invention provides a method for manufacture of a sample holder for use in a device for image-based analysis of multiple samples, which may be a device as discussed above, the sample holder comprising: an optically flat surface; multiple locations of interest dispersed across the optically flat surface that each, in use, correspond to locations of a sample of the multiple samples; and multiple focal structures associated with the multiple locations of interest; the method comprising forming each focal structure as at least one pyramid shaped indentation in the optically flat surface.

The method may include forming the focal structures and/or the locations of interest with features as discussed above. The locations of interest on the sample holder may be volumes for containing sample fluids of the multiple samples. The volumes may be as discussed above, and thus the method may include forming volumes such as those discussed above, including wells and/or channels. The sample holder may be formed with the focal structures in proximity to the locations of interest as set out above, and where there are multiple pyramids in each focal structure then the spacing between each pyramid is no more than the spacing of the focal structure from the location of interest.

For example, the sample holder may be provided with multiple wells spaced apart along a channel that provides for fluid communication between the wells, with the focal structure(s) being within three or four widths of the well from the end of the channel. The method may include providing multiple wells with antibiotics in the wells ready for use with a sample fluid. For example, the wells may include the antibiotics in powder form, with different wells including different antibiotics and/or antibiotics in different concentrations.

The method may include moulding the pyramid indentation(s) of the focal structures based on features formed using the crystal planes of the material of a template or a master, for example by etching of a silicon template that is used to form a master with the reverse geometry, where the sample holder or a layer thereof (such as the optically flat layer discussed above) is formed by moulding based on the master.

The method may include forming a template with an optically flat surface, preferably by aligning the surface with a crystal plane of a crystalline material, applying a mask to the surface, the mask being provided with circular holes at the required location for the pyramid(s), etching the template to form the pyramid(s) and then removing the mask. The method may then include producing a master that is an inverse of the template, followed by using the master to form the optically flat surface and focal structures for the sample holder. The template material may be silicon. The master may be produced by electro-plating of the silicon. The optically flat surface and focal structures for the sample holder may be formed by moulding using the master, for example via injection moulding.

Since a CD type manufacturing process can be used then the sample holder may be formed as a disc shape with a circular geometry similar to a CD. As noted above, this is an advantageous feature but not an essential feature and alternative geometries could be used, whilst still making use of a similar template and master moulding process to ensure an optically flat surface and accurately formed focus structures.

The method may include using a transparent material for at least a part of the sample holder, which may be the optically flat surface and the focal structures. The method may include injection moulding of the optically flat surface and the focal structures, for example materials as discussed above in connection with the sample holder.

The method may include forming the optically flat surface and the focal structures on a first layer of the sample holder, the first layer also providing a base for the volumes that will, in use, contain the samples. The method may then include providing a second layer on top of the first, optically flat layer, with the second layer forming side walls the volumes. The optically flat layer may be manufactured using a master that itself is derived from a template with similar shape to the optically flat layer as explained above. There may be a third layer above the second layer, wherein the third layer encloses the tops of the volumes. The third layer is preferably a layer that is transparent to an imaging system as used, for example, in the method and device for image analysis as explained above. The third layer may comprise a gas permeable material and/or may include openings for release of gases from the samples. The third layer could have vents or holes, optionally covered with gas permeable membranes.

The invention extends to a system for antibiotic susceptibility testing comprising the sample holder or device as discussed above.

The invention also extends to a system for antibiotic susceptibility testing and pathogen identification comprising the sample holder or device as discussed above.

For the avoidance of doubt, it should be noted that the sample holder of the fourth and subsequent aspects could be used in the method of the first aspect and similar used by the computer programme product of the second aspect. The sample holder may be provided as a part of the device of the third aspect.

Preferred embodiments of the present invention will now be described by reference to the accompanying figures, in which.

An example embodiment uses a sample holder as shown in FIGS. 1 to 4 in the image based analysis of samples. The method is carried out using a suitable device, which includes an imaging device in the form of a digital camera. An example of a device for image based analysis of samples is described below in connection with FIG. 6. The samples include microscopic objects and it is necessary to ensure a correct focus of the camera on the samples so that the presence, absence, or number/amount of microscopic objects can be reliably determined. The sample holder is therefore provided with a focal structure that allows a later image analysis system to check that the focus is correct.

Sample Holder

Figure 1:
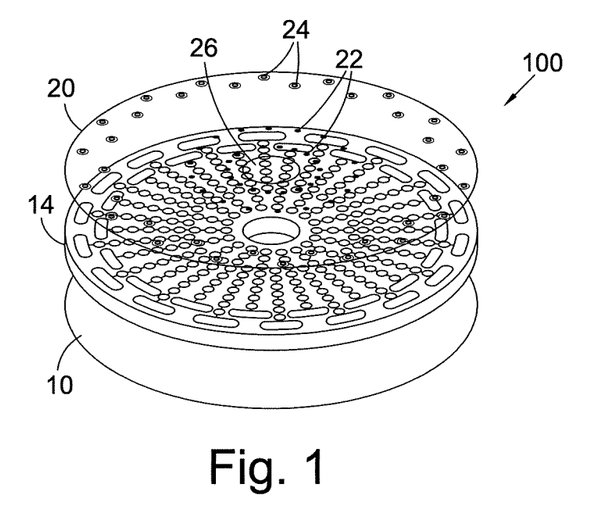
FIG. 1 shows a sample holder with a layered construction.
Figure 2:
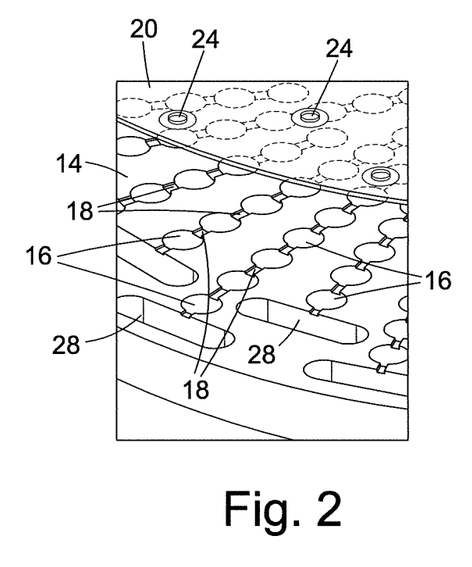
FIG. 2 is a close up view of a part of FIG. 1 including wells for holding samples.
Figure 3:
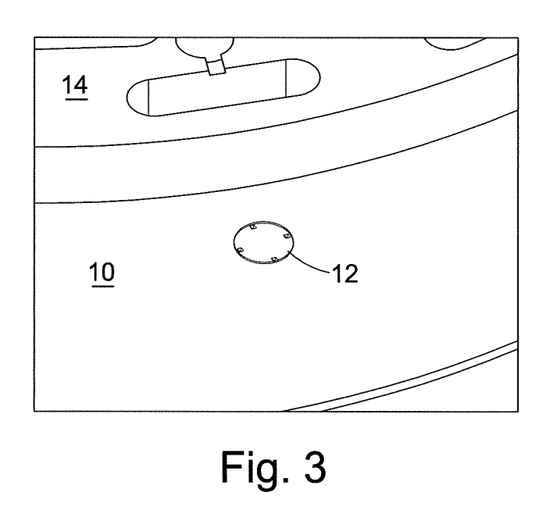
FIG. 3 is a close up view of a part of FIG. 1 showing a focal structure, which is too small to be seen in FIG. 1.
Figure 4:
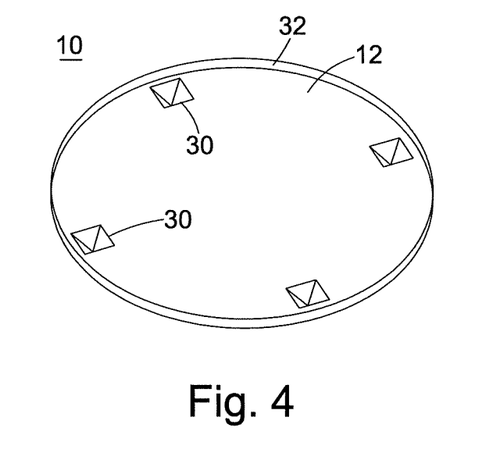
FIG. 4 is a magnified view of a focal structure using pyramid indentations.

As seen in FIG. 1, the sample holder 100 has three layers. A first, optically flat, layer 10 forms a base layer and as shown in the enlarged drawings of FIGS. 3 and 4 this layer includes the focal structures 12. A second layer 14 is placed on top of the first layer 10 and is formed with volumes for holding sample fluids in wells 16 that are connected via along channels 18. There are multiple channels 18 each with their own wells 16. The first layer 10 closes the bottoms of the wells 16. A third layer 20 covers the tops of the wells 16 and the channels 18. The third layer 20 includes openings 22 at one end of each of the channels 18 to allow for dispensing of sample fluid(s) into each channel 18, and then along the channels 18 to fill all of the wells 16. The third layer 20 also includes vents 24 at the other ends of each of the channels 18 to allow for gas to leave the channels 18 as they are filled with the sample fluid(s). The vents 24 and optionally also the openings 22 may be covered by a gas permeable membrane. FIG. 2 shows enlarged detail of the second layer 14 and third layer 20. The channels 18 connect the upper parts of the wells 16. At the end of each channel 18 is a reservoir 28 for any excess of the sample fluid.

All of the layers 10, 14, 20 have a central hole 26 that is used during loading of the sample holder 100 into a device for taking images of the samples. In this example the sample holder 100 has a circular geometry and it can be held in a similar fashion to a CD, thus being supported on a spindle platter and held for rotation with imaging elements above and/or below the sample holder 100. The central hold 26 forms the mounting to couple the sample holder 100 to a spindle platter. The channels 18 extend outward from the centre of the sample holder 100 toward the outer circumference, and they are spaced about along radial lines as well as being staggered with a first set of channels 18 having their start and end further from the centre of the sample holder 100, and each second channel 18 starting and ending closer to the centre of the sample holder 100. Alternatively, the channels are not staggered, such that each channel starts at the same distance from the centre of the sample holder 100, and ends at the same distance from the centre of the sample holder 100. The first layer 10 and the third layer 20 should be transparent to light in the wavelengths used for imaging the samples and typically will be transparent to visible light. The second layer 14 need not be transparent, although it may be. The method for manufacture of the first layer is set out below. The second layer 14 can be injection moulded. The third layer 20 is generally relatively thin and might be cut from sheet material, with the openings 22 and vents 24 cut through the sheet. In an alternative the vents 24 might be dispensed with if the third layer 20 is gas permeable.

In case of use in a fluorescent analysis, the first layer 10, second layer 14, and third layer 20 should be non-fluorescent in the relevant wavelength region (for example, 450-700 nm).

Focal Structure

At the end of some or all of the channels 18 a focal structure 12 is formed on the surface of the first, optically flat, layer 10. The focal structures 12 may be at the end of each channel 18. A method for forming the optically flat surface and the focal structure 12 is described below. The focal structure 12 may be placed close to the end of the channel 18 in order that it can be captured in the same image as an image of the channel 18 and one or more of the wells 16. In an alternative arrangement there might be a focal structure 12 at the base of each well 16 (i.e. in the optically flat surface beneath the fluid), or there could be focal structures 12 adjacent each well 16 or adjacent each channel 18, with the latter being similar to the arrangement of US 2015/293270. Whatever the arrangement of the focal structure 12, the sample holder 100 is imaged so that a focal structure 12 is present in each image along with the locations of interest on the sample holder 100, which would be the volumes of sample fluid inside the wells 16 in this example.

In another arrangement, each channel 18 may have a plurality of associated focal structures 12 spaced at set distances from the centre of the sample holder, such that the focal structures lie along concentric circles centred on the centre of the sample holder. The focal structures 12 may be provided between adjacent wells, spaced inwardly of the outer width of the wells. The focal structures may be spaced to appear in every 10th line, every 50th line, or every 100th line, for example, when a line camera is used for imaging.

The focal structure 12 is used in a method as set out below to check the focus in an image. The image is taken with a pre-set focal plane, or optionally a mechanism for continuous rapid focusing might be used whilst the images are being taken. The pre-set focal plane can be determined based on focusing a camera on the focal structure 12, or it might be determined by other means. The camera that is used to set the focal plane can be the same as the camera used to take the images for analysis of samples on the sample holder 100. Alternatively a dedicated focusing camera might be used, as shown for example in FIG. 6 below.

Figures 5A, 5B, 6:
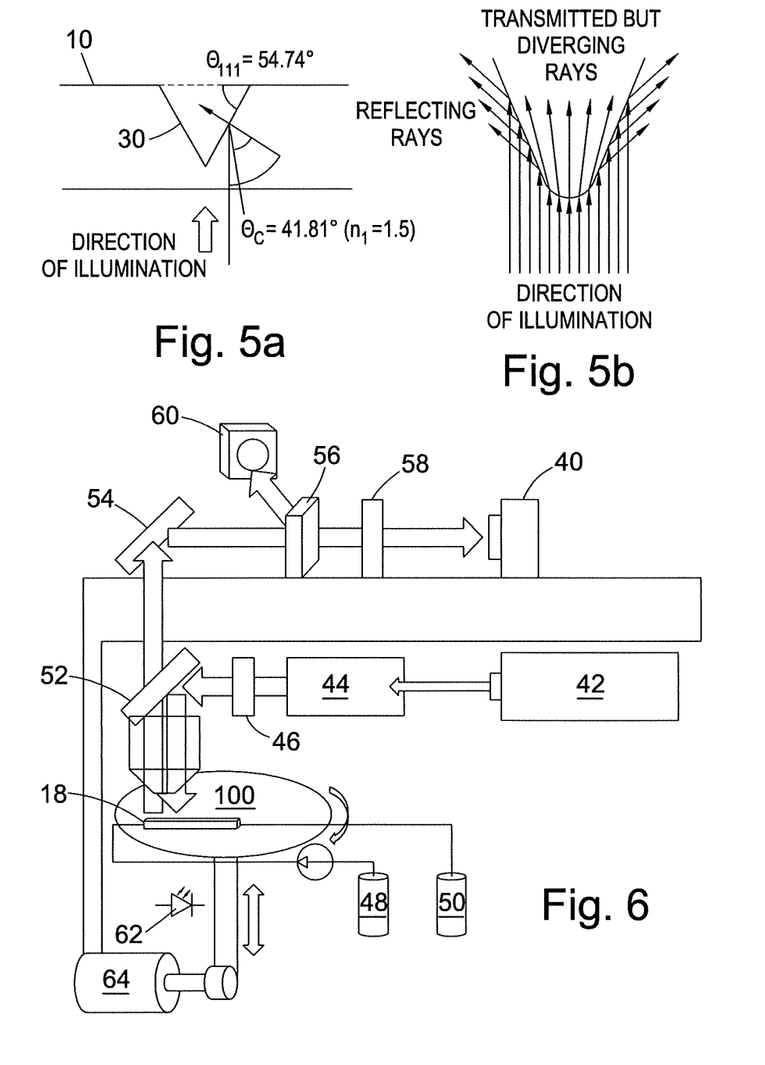
FIGS. 5a and 5b illustrate a light beam directed at a pyramid indentation and the resultant reflection and refraction of light rays.
FIG. 6 shows an example apparatus using high speed fluorescence detection to detect objects in a sample holder and FIG. 7 shows a schematic layout of wells and focal structures.

FIGS. 5a and 5b show the operation of the pyramid indentations 30 to provide an image feature with a sharp contrast when the pyramid is illuminated from below with a light beam that is close to perpendicular to the optically flat surface. FIG. 5a shows the geometry of the optically flat surface and sides of pyramid indentations 30 when formed aligned with crystal planes of silicon in the manner described below. The side walls are at 54.7° to the flat surface. As illustrated in FIG. 5b a collimated light beam perpendicular to the flat surface gives rise to total internal reflection on the sidewalls of the pyramid 30 when the refractive index of the material of the first layer 12 is greater than about 1.22 (i.e.)) 1/sin(54.7°. In the case of a less than perfectly collimated beam, the reflection may not be total, but it is still sufficient for contrast detection as detailed below.

As a result of the total internal reflection, when viewed from the top, the majority of the area of the pyramid indentation 30 appears dark. If the imaging camera is focused exactly on the base of the pyramid indentation 30, where the sidewalls meet and form the point of the pyramid indentation 30, then a bright spot appears. The contrast between this bright spot and the darker area of the surrounding part of the pyramid changes rapidly with changing focal plane, thereby allowing precise contrast-based focusing.

Manufacture of the Focal Structures

The focal structures 12 consist of a pattern of indentations 30, 32 in the first layer 10 of the sample holder 100. The first layer is manufactured by injection moulding using a production master in e.g. nickel produced from a silicon template. This process is similar to the processes used for manufacture of compact discs as used for storage of data and music. In fact a CD moulding machine may be used to create the discs. The silicon template is etched with indentations taking the exact same form as the required focal structures 12. The same reference numbers as are used herein for the features of the first layer 10 are used below to indicate the corresponding features of the silicon template.

The template is used to serve as a template of opposite polarity to form a replication master (production master plate, or master) that itself is used for production of the first layer 10 with its optically flat surface and focal structures 12. The replication process can for instance be thermoplastic injection moulding or casting. The production master plate may comprise nickel and may be produced by electroplating. In one preferred embodiment the replication master is used in CD-based thermoplastic injection moulding, to generate CD shaped first layers 10 with focal structures 12 as described above.

A silicon wafer is used to form the optically flat surface of the template, which corresponds to the optically flat surface of the first layer 10 and is aligned with the (100) surface of the silicon. The pyramids 30 are etched along the {111} planes of the silicon crystal wafer. The angle between the surface of the master and the {111} planes is then 54.7°. A circle 32 located around the pyramid indentations 30 is etched independent of the orientation of the crystal axes in the silicon substrate using deep reactive-ion etching (DRIE), before the pyramid indentations 30 are formed. In such a case it is normal to use SIO Silicon to use the embedded oxide layer to define the bottom of the wells where the pyramid structures are subsequently to be formed. The purpose of forming the first recess is to define the well size and also to enable, for instance, deposition of drugs or compounds already in the first injection moulded structure, i.e. both the wells and the focus structures can be formed in the same molded structure and in the same molding cycle thereby not needing any combination of a second structure to form the wells. This is similar to the process for forming the channels and focal structures in the prior art disclosure of US 2015/293270. Alternatively, the pyramids 30 can be directly etched into the {100} plane with edges following the {111} plane and no prior DRIE etching or similar is required. In such a case that the pyramids 30 are etched directly into top plane of the silicon, wells are formed in a second layer 14 as shown in FIGS. 1 to 4, for instance by bonding a second structure comprising through holes that forms a structure with wells when bonded or otherwise attached to the bottom layer 10 containing the focal structures 12. In this case the injection molded structure only contains focus structures and the wells 18 are added later.

The pyramid indentations 30 are etched by wet etching, for example with potassium hydroxide (KOH). The depth of the pyramids 30 is defined by the diameter of opening in the mask used for wet etching. A circular hole in the mask can be formed with a high degree of accuracy and will give rise to etching of a pyramid shaped indentation 30 with the same high degree of accuracy. The focal structures 12 hence provide a focus reference point adjacent to the sample(s) that allows for a straightforward check that the images of the samples are in focus. It should be noted that the relationship between focus structure depth and the desired focal plane for the sample images can be set at a predetermined off-set to each other. The focal structures can be on elevated platforms, with the tip of the pyramids level with the required focal plane. Alternatively, some focal structures might have tips at defined distances from the focal plane. This can aid in determining how far from focus the image is, opening up the possibility of optional image reconstitution. It should also be noted that there is some exaggeration of scale in FIGS. 1 to 4. The pyramids 30 may be very shallow and then be within the depth of focus even if the required focal depth is at the optically flat surface or slightly above. Further, since the pyramids are identical in depth all the time then they provide information on the focus even if the tip of the pyramid 30 is not in the exact same focal plane as the required focal plane for the sample. The image of the focal structure can be checked against an image of the same focal structure with the same divergence from focus on the tip of the pyramid to thereby check that the focus on the sample will be correct.

The materials used to manufacture the injection-moulded first layer 12 may be Zeonor® 1060R with a refractive index of 1.5, or hardened PDMS (refractive index 1.4). The refractive index of the material should be greater than about 1.22 (1/sin(54.7°)) so that there is internal reflection of light incident on the focal structures 12 from below. Other suitable materials can of course also be used for the detection disc such as UV-grade-PMMA, PMMA, PC or other COC polymer based materials. In order to have as sharp focusing structures as possible it is preferable to use thermoplastic materials with excellent form-filling and flow characteristics.

Device for Image Based Analysis of Samples

FIG. 6 shows an example of a device that can make use of the sample holder 100 for image based analysis of samples. The sample holder 100 is a circular disc as shown in FIGS. 1 to 4 and it is held on a spindle platter for rotation in a fashion similar to a CD. The rotation of the sample holder 100 will bring different channels 18 into line with the optics of the device. The optics include illumination side optics in the form of one or more lasers 42 with wavelengths set based on the nature of the samples that are to be imaged. The laser beams are collimated through individually focusable beam expanders 44, bringing the beam diameters up to about 8 mm (1/e2). The beams are made collinear and the collinear beams are passed through a beam shaping lens 46, designed to produce in conjunction with a high numerical objective (Zeiss Fluar 40x, NA 1.3, Carl Zeiss AB, Stockholm, Sweden), a line illumination profile along the length of the channel 18 taking in all of the wells 16. Finally, just prior to the objective entrance pupil, the laser light passes through a laser-pass dichroic mirror 48 (Semrock Inc., Rochester, N.Y.).

The optics further include detection side optics for processing the emitted light from the samples. The emitted light collected through the objective is reflected or passes through the dichroic mirror 52, and a full mirror 54, after which it is collected by one or more CCD line detectors 40 (DALSA Spyder 3, 1024 pixels, line rate 5 kHz, Parameter AB, Stockholm, Sweden). Dichroic mirrors and band-pass filters (not shown) can be used to direct light of particular wavelengths via lenses 58 to the detectors 40. During imaging the optics and the sample holder 100 may move relative to one another so that the line camera(s) 40 can obtain an image for an area including the wells 16 and the focal structure 12. This could be a rotation or a translation movement.

Figure 7:
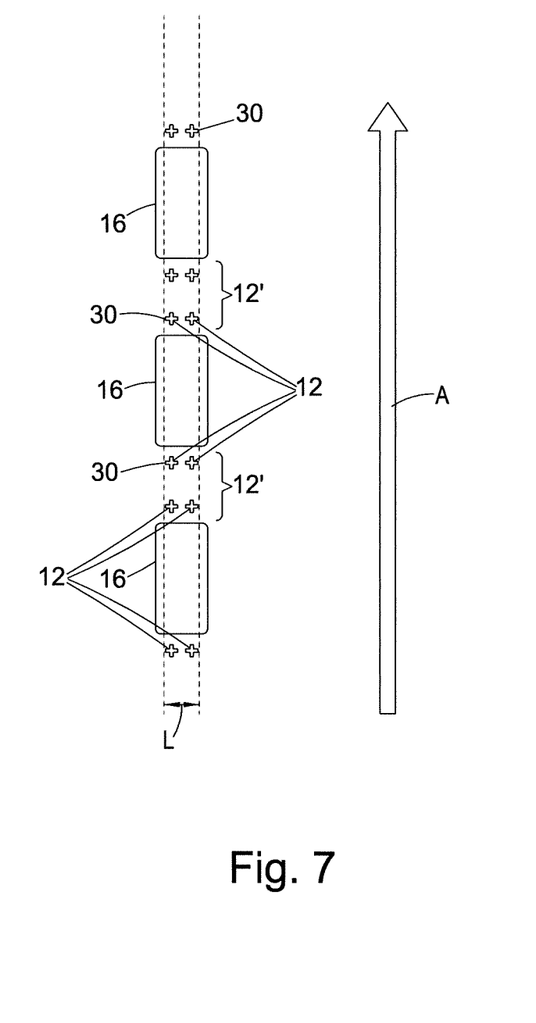

FIG. 7 shows a schematic layout of wells 16 and focal structures 12, 12' comprising pyramid indentations 30 (which here are shown schematically as crosses) along a single channel 18 (not shown). The line camera 40 scans along the line of wells in the direction shown by arrow A. The active length of the line camera (i.e. the length of line captured by the camera in each single pixel-wide frame) is shown by arrow L. The composite image obtained by the line camera 40 includes all of the wells 16 and focal structures 12, 12' along the channel, but this composite image may be processed by the image processing algorithm to split the composite into separate image areas, each including a well and respective focal structure 12, 12'. In one example, the focal structure 12 associated with a given well 16 comprises two pyramid indentations 30 at each end of the well. In another example, there is a focal structure 12' comprising four pyramid indentations 30 at the end of each well 16. In each case the geometry (i.e. layout of the pyramid indentations 30) may be the same (as shown in FIG. 7), but the subsequent association of a focal structure 12, 12' with a well 16 in the imaging processing is different.

A small portion of the fluorescent light can be redirected by a beam sampler 56 onto a CCD area detector 60 (μEye UI-1545LE-M, Parameter AB, Stockholm, Sweden) in order to allow for channel alignment and pre-focusing. An LED 62 beneath the sample holder 100 can be used as the light source for pre-focussing. There may be a motor 64 for moving the sample holder 100 and optics relative to one another in order to change the focus.

The focussing can use the dedicated focussing camera 60 and it is carried out automatically as a part of the test cycle for the apparatus to set a focal plane for images obtained via the line camera(s) 40. The focussing camera 60 may be a CCD area imaging chip. It is an area camera, i.e. a camera that captures a two dimensional image. Focussing can be carried out by a suitable algorithm. One algorithm is explained below.

The device further includes fluidics for dispensing sample fluid and for collecting waste fluid. Depending on the type of test, different fluidics arrangements might be implemented. In general there will be one or more sources of sample fluid 48 and a waste reservoir 50.

In the use of the device, the sample holder is provided with appropriate samples in locations of interest on the sample holder, for example in wells 16. Images of the samples are gathered using the line camera 40 and a pre-set focal plane, or optionally a continuous rapid focussing mechanism might be used as noted above. What is important for current purposes is that the focus of the image is checked after the image has been taken and using the focal structures 12. An image analysis system checks the images to ensure that they are in focus by identifying the focal structures 12 and checking that they are in focus, or that they are out of focus to the correct degree as discussed above. If any of the images are not in focus then an indication can be given to the user and/or remedial action can be taken. The image analysis system may also carry out further image analysis, for example to determine the presence, absence, or amount of microscopic objects and/or to determine the type of microscopic objects.

Focusing Algorithm

The focus plane for the pre-set focus of the line camera 40 (when a pre-set focus is used) can be determined using a method as set out below. First, the focal plane placed at a known position relative to the position of the bottom of the pyramid indentations 30. That is, it is known that the pyramid will not be in focus, but the position is close enough so the dark area of each of the pyramid indentations 30 of the focal structure 12 can be identified. Also, it is known whether the actual focus position is on the far or near side of the required focal plane.

First the algorithm finds the dark area of the pyramid, and masks this. Then, using a pre-defined threshold, the algorithm tries to find a lighter area contained within the dark area. If it succeeds, a contrast value is calculated. The algorithm then moves the focal plane a defined step size closer to the groove bottom, the procedure is repeated, and as long as the contrast value increased, the algorithm moves in the same direction. When a contrast value smaller than the previous is calculated, the direction of movement is reversed, and the step size is halved. This continues until a max focus value using the smallest step size possible is reached. The tip of the pyramid indentation 30 is then focused to within less than 1 µm, or even within less than 0.5 µm.

An alternative and faster algorithm is described below. First, as above, the algorithm finds the dark area of the pyramid, masks it, and tries to find a lighter area contained within the dark area using a pre-defined threshold. If it succeeds, a contrast value is calculated. The algorithm then moves the focal plane a constant step size closer to the groove bottom and the procedure is repeated. Here, the constant step size is smaller than the initial step size used in the algorithm described above. The algorithm stops once the contrast value exceeds a certain predetermined value.

Microscopy AST

One use for a device as shown in FIG. 6 is microscopy AST. With this example a sample holder 100 as in FIGS. 1-4 is used, with the wells 16 each being provided with antibiotics for use in the AST. In one example each sequence of wells 16 along a channel 18 has antibiotics of the same type but of differing concentration, with the different channels 18 containing different types of antibiotics. The antibiotics may be provided to the wells 16 during manufacture of the sample holder 100, for example by adding them in powder form and/or adhering them to the walls of the wells 16. Thus, the sample holder 100 may be mass produced with a set of antibiotics ready for use in AST, thereby providing a convenient consumable product that can be used with the method described herein for rapid image based AST. A sample fluid can be added to the wells 16 by the device of FIG. 6, for example from the source of fluid 48, or it might be added before the sample holder 100 is fitted to the device.

When the samples are ready for AST then the device of FIG. 6 is used to obtain images of each set of wells 16, with these images also including an associated focal structure 12. The images are then passed to an image analysis system, which automatically identifies and checks the focal structures 12. If the focal structures 12 confirm that the image is well-focused then it can be passed on for further analysis. If it is found that an image is out of focus then this is indicated to the user and/or remedial action is taken. The image analysis system may further analyse the images to determine the presence, absence, or amount of microorganisms. The results of this analysis can then be used to establish which antibiotics are the most effective. It is particularly important with this type of analysis, where the absence of microscopic objects needs to be accurately determined, that it can be ensured that the images are in focus. If the focus cannot be guaranteed then there is a risk that an out of focus image might mistakenly be interpreted as an image showing an absence of microorganisms High-Fluorescence Detection of RCPs Another use for a device as shown in FIG. 6, making use of the focal structure 12 and the focus checking method described above is detection of RCPs. Solutions containing the labelled RCPs are analysed by adapting the line detector 40 of FIG. 6 as a dedicated high-speed fluorescence detection instrument as set out below. The sample holder 100 could be similar to that of US 2015/293270, and hence have channels 18 without wells 16, and it can be adapted by advantageously making use of the focal structures 12 as described above in place of the grooves of US 2015/293270. The sample solution is pushed through a channel 18 with a cross section of 200×40 µm (W×H). Such dimensions are of course not limiting. The channel 18 may for example have a cross section of less than 1000×100 µm or less than 5000×50 µm. The flow channels 18 are aligned radially on a CD-format plastic disc as the sample holder 100, with appropriate optically clear lid and fluid interfaces, allowing rapid change of channel 18 in case of a malfunction or clog.

In this example, three lasers 42 with wavelengths of 488 nm (Calypso, 100 mW, Cobolt AB, Solna, Sweden), 532 nm (Samba 300 mW, Cobolt AB, and 640 nm (Cube 640, 40 mW, Coherent Inc., Santa Clara, Calif.), are collimated through individually focusable beam expanders 44, bringing the beam diameters up to about 8 mm (1/e2). The beams are made collinear and the collinear beams are passed through a beam shaping lens 46, designed to produce in conjunction with a high numerical objective (Zeiss Fluar 40x, NA 1.3, Carl Zeiss AB, Stockholm, Sweden), a line illumination profile across the interrogation volume of the flow channel. Finally, just prior to the objective entrance pupil, the laser light passes through a laser-pass dichroic mirror 48 (Semrock Inc., Rochester, N.Y.).

Fluorescent light is emitted by RCPs pumped across the interrogation volume using a syringe pump 48 (Tecan XLP6000, Tecan Nordic AB, Mölndal, Sweden), with waste sample fluid being passed to a waste reservoir 50. The emitted wavelength(s) corresponds to the emission spectra of the fluorescent labels bound to RCPs. The emitted light is collected through the objective is reflected or passes through the dichroic mirror 52, and a full mirror 54, after which it is further collected by CCD line detectors 40 (DALSA Spyder 3, 1024 pixels, line rate 5 kHz, Parameter AB, Stockholm, Sweden). Dichroic mirrors and band-pass filters (not shown) are used to direct the light from each specific fluorophore via lenses 58 to a specific detector 40. A small portion of the fluorescent light can be redirected by a beam sampler 56 onto a CCD area detector 60 (µEye UI-1545LE-M, Parameter AB, Stockholm, Sweden) in order to allow for channel alignment and pre-focusing. An LED 62 beneath the sample holder 100 can be used as the light source for pre-focussing. There may be a motor 64 for moving the sample holder 100 and optics relative to one another in order to change the focus.

From each detector 40 the results of each sample run are registered as a series of x-t images where each RCP is identified through image analysis. The image analysis consists of background subtraction, pattern recognition, pattern matching across detectors for multiply fluorescent objects discrimination of RCPs and non-specific events, and RCP counting. For each reagent, a threshold for the number of RCPs is set to designate a positive sample. For each image the focal structure 12 is identified and the image analysis algorithm checks that the pyramid indentations 30 are in focus. If there is an out of focus image then remedial action can be taken. It will be appreciated that by checking the focus of the image after it is taken rather than checking and setting the focus for each image before it is taken then the process is made significantly faster than that of US 2015/293270, and furthermore the use of the proposed focal structure 12 with pyramid indentations makes the manufacture of the sample holder 100 simpler and more accurate.

FURTHER EXAMPLES AND VARIATIONS

It will be appreciated that the features of the device of FIG. 6 could be varied whilst still taking advantage of the novel features relating to the focus checking method and the focal structure 12. For example, the optics and the imaging device 40 could be replaced by other systems for obtaining a digital image of the samples and the focal structures 30. Any suitable imaging technique could be used. Moreover, the advantages from the novel features of the invention are not limited only to the example uses described above in relation to microscopy AST and detection of RCPs, but instead they could be applied to other drug susceptibility tests, as well as sample analysis in any field where it is required to obtain guaranteed in-focus images of samples for image based analysis, especially in the case of microscopic objects within the samples.

The invention claimed is:

1. A method of image-based analysis of multiple samples, the method comprising:
    using a sample holder having multiple locations of interest and an optically flat surface with multiple focal structures in the optically flat surface that are each associated one or more with the multiple locations of interest, wherein the multiple samples are dispersed across the multiple locations of interest;
    obtaining digital image areas of the multiple locations of interest, thereby obtaining multiple digital image areas for use in analysis of the multiple samples with each of the digital image areas including at least one of the multiple locations of interest and at least one of the focal structures, wherein each digital image area is a composite of a plurality of frames, each frame of which is a single line of pixels imaged by an imaging device comprising a line camera, wherein the plurality of frames is obtained whilst using rapid continuous focusing and moving the locations of interest relative to the line camera line, but without checking the focus via the focal structure for each frame;
    only after obtaining multiple digital image areas, using an image processing algorithm to analyze each of the digital image areas and check if the focal structure indicates that the digital image area is in clear focus; and
    providing an indication and/or taking remedial action if the image processing algorithm indicates that any digital image areas are out of focus.

2. A method as claimed in claim 1, comprising checking that the focal structures are imaged clearly where the focal structures lie in a focal plane required for clear imaging of the samples, or checking that the focal structures are imaged in a manner that is consistent with the required focal plane in the case where the focal structures lie outside of the focal plane required for clear imaging of the samples.

3. A method as claimed in claim 1, wherein the focal structures include three dimensional shapes formed as pits or protrusions in the sample holder.

4. A method as claimed in claim 1, wherein the focal structures include angled sides with an angle set based on the refractive index of the material that surrounds the focal structures such that all of or the majority of incident light from beneath the focal structure is reflected internally.

5. A method as claimed in claim 1, wherein the samples are test samples in which the presence, amount, and/or absence of microscopic objects depends on the results of a test.

6. A method of image based analysis of multiple samples for microscopy based antibiotic susceptibility testing comprising the method of claim 1, wherein the sample holder is used with multiple samples of interest relating to multiple different antibiotics and/or different concentrations of antibiotics, and wherein the digital image areas are for determining presence or absence of micro-organisms such as bacteria and/or the amount of microorganisms, thereby identifying which antibiotics and/or which concentrations are effective at inhibiting microbial growth.

7. A method as claimed in claim 1, comprising determining if a microscopic object is present in the digital image area.

8. A method as claimed in claim 7, wherein the microscopic objects are objects contained in a sample fluid, and the locations of interest on the sample holder are volumes for containing sample fluids of the multiple samples.

9. A method as claimed in claim 1, wherein the locations of interest include wells and/or channels in or on the sample holder that provide volumes for containing the samples.

10. A method as claimed in claim 9, wherein each focal structure is adjacent to the volume of one or more associated locations of interest and is sufficiently close to an edge of the volume that it can be included in the same digital image area as the sample(s) at the location(s) of interest.

11. A method as claimed in claim 10, wherein the imaging device and the sample holder as a combination are arranged such that the imaging device is capable of imaging the volume of the location of interest with the associated focal structure being in the same digital image area.

12. A non-transitory computer program product containing instructions for execution on a device for image-based analysis of multiple samples, the device comprising:
    a sample holder having multiple locations of interest and an optically flat surface defining multiple focal structures, each of the focal structures being associated with one or more of the multiple locations of interest, wherein the multiple samples are, in use, dispersed across the multiple locations of interest;
    an imaging device comprising a line camera; and
    an image processing system;

wherein the instructions when executed will configure the device to:

obtain digital image areas of the multiple locations of interest using the imaging device with each of the digital image areas including at least one of the multiple locations of interest and at least one of the focal structures, wherein each digital image area is a composite of a plurality of frames, each frame of which is a single line of pixels imaged by the line camera, wherein the plurality of frames is obtained whilst using rapid continuous focusing and moving the locations of interest relative to the line camera line, but without checking the focus via the focal structure for each frame;

after obtaining multiple digital image areas, analyze each of the digital image areas and check if the at least one focal structure indicates that the digital image area is in clear focus; and provide an indication and/or take remedial action if the image processing algorithm indicates that any digital image areas are out of focus.

13. A device for image-based analysis of multiple samples, the device comprising:

a sample holder having multiple locations of interest and an optically-flat surface including multiple focal structures, each of the focal structures being associated with one or more of the multiple locations of interest, wherein the multiple samples are, in use, dispersed across the multiple locations of interest;

an imaging device comprising a line camera, the imaging device being arranged to obtain digital image areas of the multiple locations of interest with each of the digital image areas including at least one of the multiple locations of interest and at least one of the focal structures, wherein each digital image area is a composite of a plurality of frames, each frame of which is a single line of pixels imaged by the line camera, wherein the plurality of frames is obtained whilst using rapid continuous focusing and moving the locations of interest relative to the line camera line, but without checking the focus via the focal structure for each frame; and an image processing system arranged to analyze each of the digital image areas and check if the focal structure indicates that the digital image area is in clear focus after obtaining multiple digital image areas; and provide an indication and/or take remedial action if the image processing algorithm indicates that any digital image areas are out of focus.

14. A device as claimed in claim 13, including multiple samples at the multiple locations of interest, the samples including microscopic objects contained in a sample fluid.

15. A device as claimed in claim 13, wherein the sample holder comprises:

an optically flat surface;

multiple locations of interest dispersed across the optically flat surface that each, in use, correspond to locations of a sample of the multiple samples; and multiple focal structures associated with the multiple locations of interest;

wherein the focal structures each comprise at least one pyramid shaped indentation in the optically flat surface.

16. A device as claimed in claim 15, wherein the locations of interest on the sample holder are volumes for containing sample fluids of the multiple samples and the focal structures are adjacent to the volume(s) of associated location(s) of interest and sufficiently close to an edge of the volume that the focal structure can be included in the same digital image area as the sample.

17. A device as claimed in claim 15, wherein the locations of interest comprise multiple wells spaced apart along a channel that provides for fluid communication between the wells, with the focal structure(s) adjacent to the end of the channel.

18. A device as claimed in claim 15, wherein each of the focal structures includes multiple pyramid shaped cavities in the optically flat surface, with each of the pyramids having the same depth such that the focal structure has multiple focal reference points via the vertices of the multiple pyramids.

19. A device as claimed in 17, comprising multiple channels, each channel with multiple wells spaced apart along the channel and connected by the channel, and each channel having an associated focal structure.

20. A device as claimed in claim 17, wherein the wells include antibiotics, with different wells including different antibiotics and/or antibiotics in different concentrations.

* * * * *